United States Patent [19]

Babson et al.

[11] 3,957,586

[45] May 18, 1976

[54] PATHOTEC RAPID IDENTIFICATION SYSTEM

[75] Inventors: Arthur L. Babson, Chester; John S. Loder, Bernardsville, both of N.J.

[73] Assignee: Warner-Lambert Company, Morris Plains, N.J.

[22] Filed: May 8, 1975

[21] Appl. No.: 575,779

Related U.S. Application Data

[63] Continuation of Ser. No. 541,909, Jan. 17, 1975, abandoned.

[52] U.S. Cl. ........................ 195/127; 195/103.5 R
[51] Int. Cl.² .......................................... C12K 1/10
[58] Field of Search ................... 195/103.5 R, 127

[56] References Cited

OTHER PUBLICATIONS

N. Divaris et al; American Journal of Medical Technology; Vol. 38, No. 2, pp. 111–114 (1972).

*Primary Examiner*—A. Louis Monacell
*Assistant Examiner*—Robert J. Warden
*Attorney, Agent, or Firm*—Albert H. Graddis; Frank S. Chow; George M. Yahwak

[57] ABSTRACT

This invention relates to a system for the identification of bacteria which comprises a series of punched cards, each card representing a different biochemical test.

5 Claims, 4 Drawing Figures

PATHOTEC
RAPID IDENTIFICATION SYSTEM

E. coli
Shigella spp.
S. sonnei
E. tarda
S. typhi
S. enteritidis
S. cholerae suis
Arizona
C. freundii
C. diversus
K. pneumoniae
K. rhino
K. ozaenae
E. cloacae
41 — □ □ □ □ E. Aerogenes
42 — □ □ □ E. hafniae
E. agglomerans
43 — □ S. marcescens
S. liquefaciens
S. rubidaea
P. vulgaris
P. mirabilis
P. morganii
P. rettgeri
Pr. alcalifaciens
Pr. stuartii
Y. enterocolitica
Y. pseudo-TB
Y. pestis

Fig.4.

PATHOTEC RAPID IDENTIFICATION SYSTEM

This application is a continuation of Ser. No. 541,909 filed Jan. 17, 1975 now abandoned.

Most bacterial diseases are diagnosed by the isolation and identification of the causitive microorganism. Insofar as possible, medical therapy should be initiated only after determination of the etiologic agent. Initially, this determination is based primarily on clinical information, but confirmatory laboratory data should always be sought as being of major importance in the subsequent management of an infective disease.

Clinical tests for bacterial identification depend upon the comparison of a number of positive and/or negative biochemical, physiological, and morphological reactions for the etiologic agent and comparing these reactions with those of known bacterial species. This means of identification is complicated, however, in that not all members of a bacterial species produce the same biochemical reactions. Thus, more than one bacterial species can often give an identical series of test reactions, but usually at different levels of probability.

We have now found that bacterial identification by a given group of taxonomic parameters such as biochemical reactions can be facilitated by a direct visual information system comprising a series of punched cards, each card representing a different biochemical test such as nitrate reduction, $H_2S$ production, etc.

This invention can best be understood by reference to the following description of certain specific embodiments of the invention which are illustrated in the drawings herein;

FIG. 4 is a view of the system in use.

Figures 1, 2:
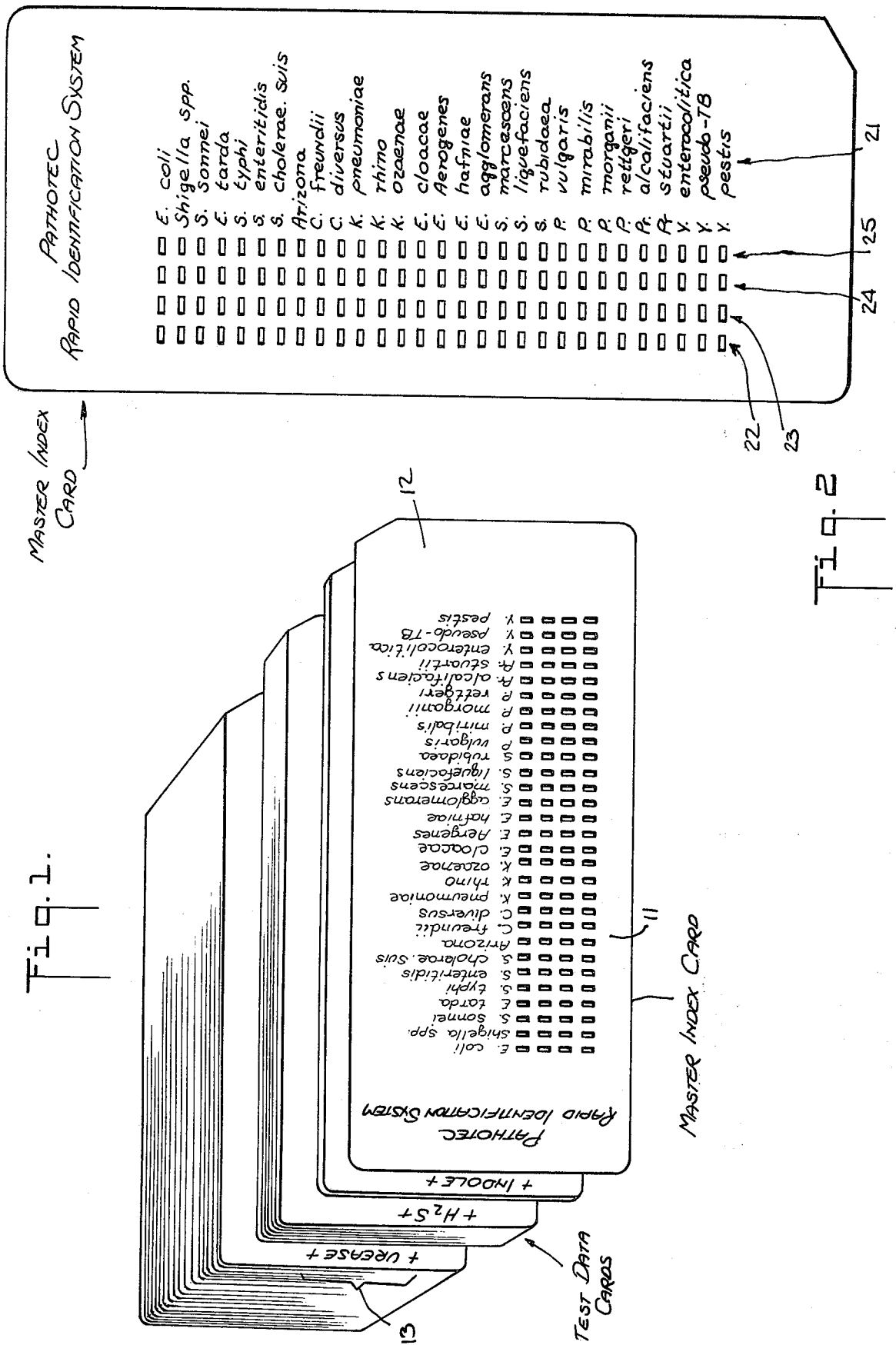
FIG. 1 is a perspective view of a pack of bacterial index cards.
FIG. 2 is a front view of a master index card.

Referring to the drawings, there is shown in FIG. 1 a master index card having an identification area 12 and an aperture area 11. There is also shown test data cards having labels 13 which indicate the result obtained in a specific biochemical reaction.

The identification area of the master index card may list as shown in FIG. 2 enteric bacterial pathogens 21, however this system will work just as well in other identification systems such as those for fungi, and other organisms. In the aperture area 11 and in linear arrangement with each named organism, there are a series of four apertures 22, 23, 24, and 25. Each aperture represents an arbitrary percentage likelihood of an organism giving a specific test reaction. The use of these apertures will become more apparent when the method of using is described below. Of course, the numbers of apertures in each lineal arrangement may differ depending upon the desired number of levels.

The test data cards are prepared so as to indicate positive biochemical test results 32 on one side 31A of the card and when the card is turned over, negative test results 33 on the reverse side 31B.

Each test data card is perforated on each face card in coordinate locations corresponding to the apertures in the master index card. These perforations are made according to statistical data in order that identification of an unknown organism may be made within a degree of probability. This data is easily compiled from the scientific literature and such data for the enteric bacteria may be found in Table 1. The biochemical reactions referred to are identified as:

| | |
|---|---|
| CO | Cytochrome Oxidase |
| N | Nitrate Reductase |
| PD | Phenylalanine Deaminase |
| $H_2S$ | Hydrogen Sulfide |
| I | Indole |
| OD | Ornithine Decarboxylase |
| LD | Lysine Decarboxylase |
| M | Malonate Utilization |
| U | Urease |
| ONPG | $\beta$-Galactosidase |
| VP | Voges-Proskauer |
| E | Esculin Hydrolysis |

TABLE 1

| | | Biochemical Reactions of the *ENTEROBACTERIACEAE* | | | | | | | | | | |
|---|---|---|---|---|---|---|---|---|---|---|---|---|
| | | CO | N | PD | $H_2S$ | I | OD | LD | M | U | ONPG | VP | E |
| *Escherichia coli* | | − | + | − | − | + | ± | ± | − | − | + | − | ± |
| | | 0 | 99 | 0 | 0 | 96 | 66 | 82 | 0 | 0 | 96 | 0 | 51 |
| *Shigella spp.* | EXCEPT | − | + | − | − | ∓ | − | − | − | − | ∓ | − | − |
| | SONNEI | 0 | 99 | 0 | 0 | 49 | 1 | 0 | 0 | 0 | 24 | 0 | 0 |
| *S. sonnei* | | − | + | − | − | − | + | − | − | − | + | − | − |
| | | 0 | 99 | 0 | 0 | 0 | 99 | 0 | 0 | 0 | 95 | 0 | 0 |
| *Edwardsiella tarda* | | − | + | − | + | + | + | + | − | − | − | − | − |
| | | 0 | 100 | 0 | 100 | 99 | 100 | 100 | 0 | 0 | 0 | 0 | 0 |
| *Salmonella typhi* | | − | + | − | + | − | − | + | − | − | − | − | − |
| | | 0 | 100 | 0 | 94ʷ | 0 | 0 | 100 | 0 | 0 | 0 | 0 | 0 |
| *S. enteritidis* | | − | + | − | + | − | + | + | − | − | − | − | − |
| | | 0 | 100 | 0 | 94 | 1 | 97 | 95 | 1 | 0 | 1 | 0 | 0 |
| *S. cholerae-suis* | | − | + | − | ± | − | + | + | − | − | − | − | − |
| | | 0 | 100 | 0 | 70 | 0 | 100 | 95 | 0 | 0 | 0 | 0 | 0 |
| *Arizona hinshawii* | | − | + | − | + | − | + | + | + | − | + | − | − |
| | | 0 | 100 | 0 | 99 | 5 | 100 | 100 | 95 | 0 | 98 | 0 | 1 |
| *Citrobacter freundii* | | − | + | − | ± | − | ∓ | − | ∓ | ± | + | − | − |
| | | 0 | 99 | 0 | 82 | 7 | 17 | 0 | 21 | 76ʷ | 91 | 0 | 4 |
| *C. diversus* | | − | + | − | − | + | + | − | + | + | + | − | ∓ |
| | | 0 | 100 | 0 | 0 | 100 | 100 | 0 | 94 | 92ʷ | 100 | 0 | 47 |
| *Klebsiella pneumoniae* | | − | + | − | − | − | − | + | + | + | + | + | + |
| | | 0 | 99 | 0 | 4 | 7 | 0 | 97 | 93 | 95 | 99 | 94 | 100 |
| *K. rhinoscleromatis* | | − | + | − | − | − | − | − | ± | − | + | − | ∓ |
| | | 0 | 100 | 0 | 0 | 0 | 0 | 0 | 50 | 0 | 100 | 0 | 15 |
| *K. ozaenae* | | − | + | − | − | − | − | ∓ | − | ∓ | + | − | ± |
| | | 0 | 92 | 0 | 0 | 0 | 1 | 42 | 6 | 30 | 90 | 0 | 75 |
| *Enterobacter cloacae* | | − | + | − | − | − | + | − | ± | ± | + | + | ∓ |
| | | 0 | 100 | 0 | 0 | 1 | 95 | 0 | 81 | 75ʷ | 98 | 99 | 29 |
| *E. aerogenes* | | − | + | − | − | − | + | + | ± | − | + | + | + |
| | | 0 | 100 | 0 | 0 | 0 | 97 | 98 | 75 | 5ʷ | 98 | 100 | 98 |
| *E. hafniae* | | − | + | − | − | − | + | + | ± | − | − | ± | − |
| | | 0 | 100 | 0 | 0 | 0 | 99 | 100 | 74 | 9ʷ | 15 | 84 | 6 |
| *E. agglomerans* | | − | ± | ∓ | − | ∓ | − | − | ± | ∓ | + | ± | ± |

TABLE 1-continued

| | Biochemical Reactions of the ENTEROBACTERIACEAE | | | | | | | | | | | |
|---|---|---|---|---|---|---|---|---|---|---|---|---|
| | CO | N | PD | H₂S | I | OD | LD | M | U | ONPG | VP | E |
| Serratia marcescens | 0 | 86 | 28 | 0 | 19 | 0 | 0 | 62 | 36 | | 68 | 62 |
| | − | + | − | − | − | + | + | − | ± | + | + | + |
| S. liquefaciens | 0 | 96 | 0 | 0 | 0 | 100 | 100 | 2 | 62ʷ | 100 | 99 | 91 |
| | − | + | − | − | − | + | + | − | ∓ | + | ± | + |
| S. rubidaea | 0 | 100 | 1 | 0 | 2ʷ | 100 | 95 | 1 | 15ʷ | 93 | 50 | 99 |
| | − | + | − | − | − | − | + | ± | ∓ | + | + | + |
| Proteus vulgaris | 0 | 100 | 0 | 0 | 2ʷ | 0 | 92 | 86 | 20ʷ | 100 | 92 | 98 |
| | − | + | + | + | + | − | − | − | + | − | − | ± |
| P. mirabilis | 0 | 100 | 100 | 95 | 91 | 0 | 0 | 0 | 95 | 0 | 0 | 62 |
| | − | + | + | + | − | + | − | − | + | − | ∓ | − |
| P. morganii | 0 | 94 | 99 | 94 | 3 | 98 | 0 | 2 | 91 | 2 | 16 | 1 |
| | − | ± | + | − | + | + | − | − | + | − | − | − |
| P. rettgeri | 0 | 89 | 95 | 0 | 100 | 96 | 0 | 5 | 98 | 0 | 0 | 0 |
| | − | + | + | − | + | − | − | − | + | − | − | ∓ |
| Providencia alcalifaciens | 0 | 98 | 98 | 0 | 97 | 0 | 0 | 1 | 100 | 10 | 0 | 39 |
| | − | + | + | − | + | − | − | − | − | − | − | − |
| P. stuartii | 0 | 100 | 97 | 0 | 99 | 1ʷ | 0 | 0 | 0 | 0 | 0 | 0 |
| | − | + | + | − | + | − | − | − | − | − | − | − |
| Yersinia enterocolitica | 0 | 100 | 94 | 0 | 99 | 0 | 0 | 0 | 0 | 4 | 0 | 0 |
| | − | + | − | − | ± | + | − | − | + | ∓ | 37°C +22°C | ∓ |
| Y. pseudotuberculosis | 0 | + | − | − | − | − | − | − | + | ± | − | + |
| Y. pestis | − | ± | − | − | − | − | − | − | − | + | − | + |
| | CO | N | PD | H₂S | I | OD | LD | M | U | ONPG | VP | E |

Number in each box represents % expected positive reactions.

Using this data, perforations were made in each test data card based upon the standard set forth in Table 2. Thus, tests in which the same organism showing 11 to 89% positive reactions are considered not to be discriminating for a specific organism.

TABLE 2

| % Positive Reactions | Number of Positive Perforations | Number of Negative Perforations |
|---|---|---|
| 99–100 | 4 | 0 |
| 97–98 | 4 | 1 |
| 95–96 | 4 | 2 |
| 90–94 | 4 | 3 |
| 11–89 | 4 | 4 |
| 6–10 | 3 | 4 |
| 4–5 | 2 | 4 |
| 2–3 | 1 | 4 |
| 0–1 | 0 | 4 |

The information in Table 2 can, of course, be modified for any desired range and number of perforations. These modifications are, of course, encompassed within the scope of this invention.

Figure 3:
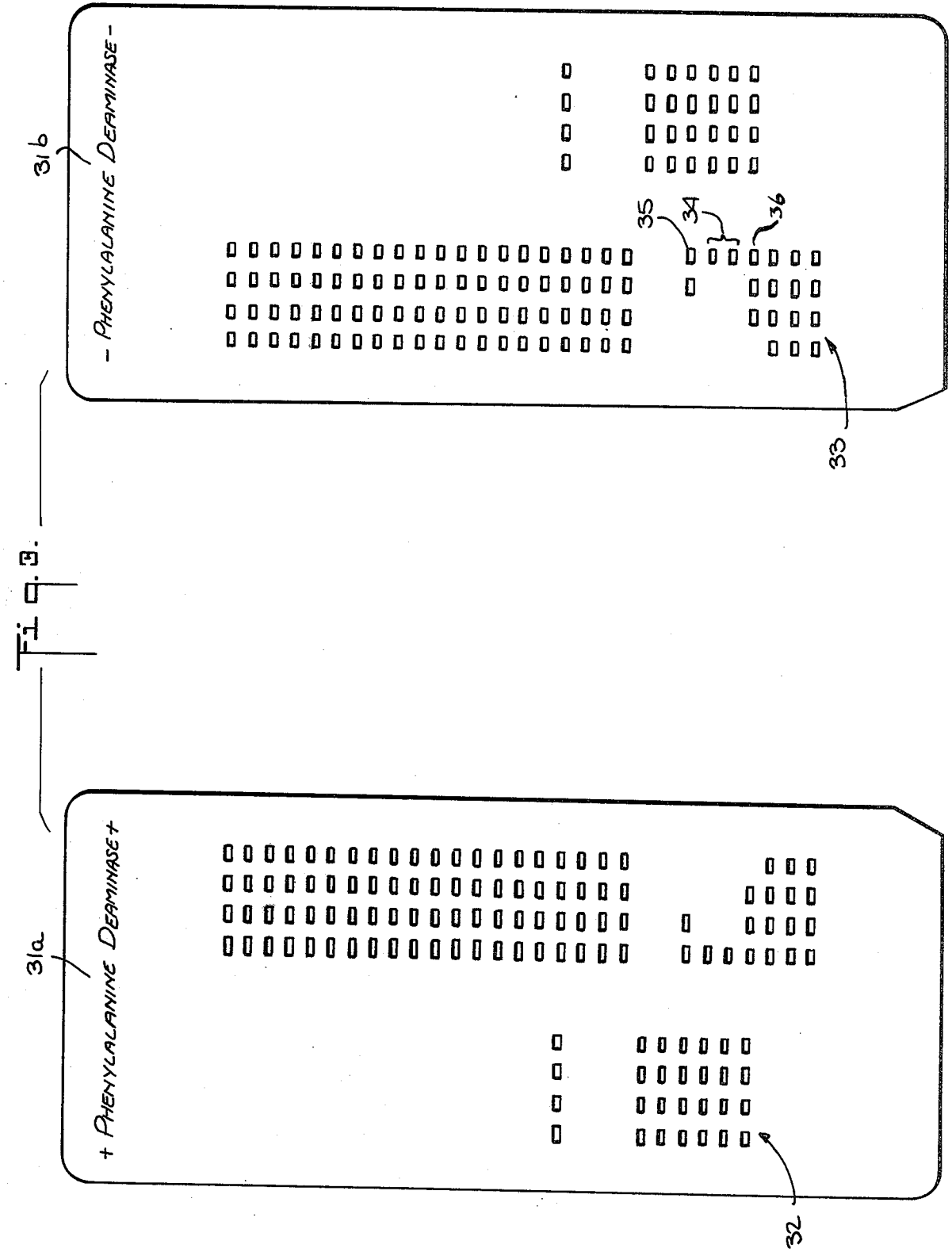
FIG. 3 is the front and rear views of a test data card.

FIG. 3 shows test data cards having two negative perforations 35 and four positive perforations corresponding to 95–96% positive reactions; three negative perforations 36 and four positive perforations corresponding to 90–94% positive reactions; and a single negative perforation 34 and four positive perforations corresponding to 97–98% positive reactions.

In use, a variable number of test data cards is added to form a deck behind the master index card. These test data cards are added with the positive or negative face forward depending upon the organism's reaction in a given test. A clear passage of light through the individual aperture of the master index card indicates the organisms which can give the observed series of test reactions, and the number of clear apertures for any particular organism indicates the probability that the particular organism is actually the one being tested. For example, the master index card and test data cards would be arranged as in FIG. 4 for an organism showing negative cytochrome oxidase, phenylalanine diaminase, hydrogen sulfide production, indole, and urease reactions; and positive nitrate reductase, ornithine decarboxylase, lysine decarboxylase, malonate utilization, β-galactosidase, Voges-Proskauer, and esculin hydrolysis reactions. The only clear passages through the master deck of cards would be those at apertures 41, 42, and 43. The organism would therefore be identified as E. aerogenes, E. hafniae, or S. marcescens. E. aerogenes is most probably the correct identification as 10% or less of E. hafnia isolates would give, this combination of test results, and 3% or less of S. marcescens would give this combination of test results.

It will be appreciated by those skilled in the art that many variations may be made in the invention without departing from the overlying principal. It is to be understood that the invention is not limited to the specific forms described, but includes other forms of the appended claims.

I claim:

1. In a system for identifying microorganisms, the combination of:
   a series of cards comprising test data cards corresponding to a single biochemical reaction, and
   a master index card;
   all of said cards being the same size and shape whereby selected groups of cards may be stacked one upon the other in a uniform manner;
   said master index card having an identification area thereon and indicia identifying specific microorganisms, and having a number of apertures adjacent and in lineal arrangement with the identifying indicia, and said test data cards having a plurality of coordinate locations on each face of each card corresponding to the apertures in the master index card when the master index card is placed in stacked relationship over the test data card, and apertures through the test data card at those locations corresponding to the biochemical reaction percentage of the identified microorganism having the corresponding aperture in the master index card.

2. The system for identifying microorganisms as defined in claim 1 wherein one face of each test data card represents a positive biochemical test reaction and the opposite face represents a negative biochemical test reaction.

3. In a system for identifying microorganisms, the combination of:
   a deck comprising a number of test data cards, and a master index card;
   all of said cards being of the same size and shape whereby selected groups of cards may be stacked in a uniform manner, and a plurality of identical coordinate locations on the respective cards being superposable when selected cards are so stacked, and each of said coordinate locations corresponding to a different percentage of obtaining a biochemical reaction, and
   said master index card being perforated at each location, and having a legend located adjacent each of said coordinate locations for identifying the microorganism associated with said each locations, and
   each of said test data cards being perforated at each coordinate position thereon corresponding to each percentage of obtaining a biochemical reaction with respect to which the biochemical test represented by that card is associated, and being perforated in a different pattern of coordinate positions than each of the other test data cards, but some of such test data cards being perforated in the same positions, and each test data card bearing a legend identifying the biochemical test associated with the precentage of obtaining a biochemical reaction represented by data recorded on that card.

4. A system for identifying microorganisms as defined in claim 3 wherein one face of each test data represents a positive biochemical test reaction and the opposite face represents a negative biochemical test reaction.

5. A system for identifying microorganisms comprising:
   a series of test data cards corresponding to a single biochemical reaction, and
   each card having a face corresponding to a positive biochemical reaction and an opposite face corresponding to a negative biochemical reaction, and
   each card having a series of linear areas, each area corresponding to a biochemical reaction for a known microorganism, and each area containing perforations corresponding to the percentage of known variants of a known microorganism which will exhibit the biochemical reaction of the test data card, and
   wherein a microorganism is identified by stacking one test data card upon another in set relationship whereby light passing through any unobscured perforation defines a specific linear area corresponding to a known microorganism and whereby the number of perforations in said linear area correspond to the degree of accuracy in the identification of the microorganism.

\* \* \* \* \*